(12) United States Patent
Chang

(10) Patent No.: US 8,046,513 B2
(45) Date of Patent: Oct. 25, 2011

(54) OUT-OF-ORDER EXECUTIVE BUS SYSTEM AND OPERATING METHOD THEREOF

(75) Inventor: Yu-Ming Chang, Taipei County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 54 days.

(21) Appl. No.: 12/507,079

(22) Filed: Jul. 22, 2009

(65) Prior Publication Data
US 2010/0023664 A1    Jan. 28, 2010

(30) Foreign Application Priority Data
Jul. 22, 2008  (TW) ................................ 97127813 A

(51) Int. Cl.
*G06F 13/36* (2006.01)
(52) U.S. Cl. ........................................ 710/112; 710/309
(58) Field of Classification Search .......... 710/104–119, 710/306–315, 40–43
See application file for complete search history.

(56) References Cited

U.S. PATENT DOCUMENTS

| | | | | |
|---|---|---|---|---|
| 6,014,721 A * | 1/2000 | Arimilli et al. | ............... | 710/315 |
| 6,996,645 B1 * | 2/2006 | Wiedenman et al. | ......... | 710/107 |
| 7,107,367 B1 * | 9/2006 | Hughes | ........................... | 710/39 |
| 7,320,100 B2 * | 1/2008 | Dixon et al. | .................. | 714/758 |
| 7,457,905 B2 * | 11/2008 | Gehman | ...................... | 710/315 |
| 7,516,209 B2 * | 4/2009 | Raghuraman et al. | ........ | 709/224 |
| 7,565,593 B2 * | 7/2009 | Dixon et al. | .................. | 714/754 |
| 7,594,069 B2 * | 9/2009 | Brady et al. | .................. | 711/112 |
| 7,783,819 B2 * | 8/2010 | Mandhani et al. | ............ | 710/313 |
| 2007/0067549 A1 | 3/2007 | Gehman | | |
| 2008/0005399 A1 * | 1/2008 | Gruber et al. | ................... | 710/42 |

* cited by examiner

*Primary Examiner* — Raymond Phan
(74) *Attorney, Agent, or Firm* — Winston Hsu; Scott Margo

(57) ABSTRACT

An operating method applied to an out-of-order executive bus system includes: according to dependency constraints, linking requests using the bus system to form dependency request links having an order; and processing the order of the requests according to the dependency request links. In addition, a bus system is provided. The bus system includes a request queue and a dependency request link generator. The request queue receives and stores a newly received request including at least a link tag. The dependency request link generator generates N dependency request links according to dependency constraints of N link tags of the newly received request, where N is any positive integer. Each link tag of the newly received request is implemented to indicate a link relation with respect to an order of the newly received request and a plurality of unserved requests preceding the newly received request.

22 Claims, 9 Drawing Sheets

OUT-OF-ORDER EXECUTIVE BUS SYSTEM AND OPERATING METHOD THEREOF

BACKGROUND OF THE INVENTION

1. Field of the Invention

The invention relates to an operating method of an out-of-order executive bus system, and more particularly, to a method of forming dependency request links according to dependency constraints in the out-of-order executive bus system.

2. Description of the Prior Art

Traditional bus protocols are all serving requests using an in-order manner. For example, Advanced High performance Bus (AHB) serves requests sequentially according to each request's order. However, such an executive method comes along with a drawback. When dealing with a data transaction with a large data amount, many following transactions will be delayed. When the system becomes larger and more complicated, the in-order executive bus architecture will fail to meet the requirement. Hence, current large-scale systems tend to employ out-of-order executive bus systems, such as Advanced extensible Interface (AXI) and Open Core Protocol (OCP) bus systems. These out-of-order executive bus systems allow the master and the slave on the bus to have more space to process the requests transmitted via the bus. In out-of-order executive bus systems, data are not queued in order. For example, requests transmitted through a command channel and the write data corresponding to the requests transmitted through a write-data channel do not enter the slave in order. Therefore, identification information, such as the thread ID or tag ID, is usually used to deal with the requests which are out-of-order but related to one another. Nevertheless, when these thread/tag IDs are transmitted on the bus out of order, the related requests will not be served in order, and errors will easily happen.

U.S. Patent Publication No. 2007/0067549 (referred to as '549 patent hereinafter) has come up with a related solution that uses the conventional first-in first-out (FIFO) conception to avoid the occurrence of data hazards caused by outstanding write requests and a following read requests, '549 patent buffers related data of the outstanding writing request in a FIFO memory, and when the potential undesired data hazard caused by the following reading operation is detected, the reading operation is paused until the processing of the outstanding write request is done to thereby avoid the data hazard. However, some problems still exist in this conventional solution. For example, when the reading operation is paused, all the following reading operations are also paused, even though there will be no data hazards if those following actions are processed first. For this reason, employing the solution proposed by the '549 patent will decrease the overall performance of the system.

SUMMARY OF THE INVENTION

To solve the above-mentioned problem, the invention therefore provides an operating method applied to out-of-order executive bus system to improve overall system performance and avoid data hazards. The method includes: according to dependency constraints, linking requests using the bus system to form dependency request links with priority; and processing the requests according to the dependency request links.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
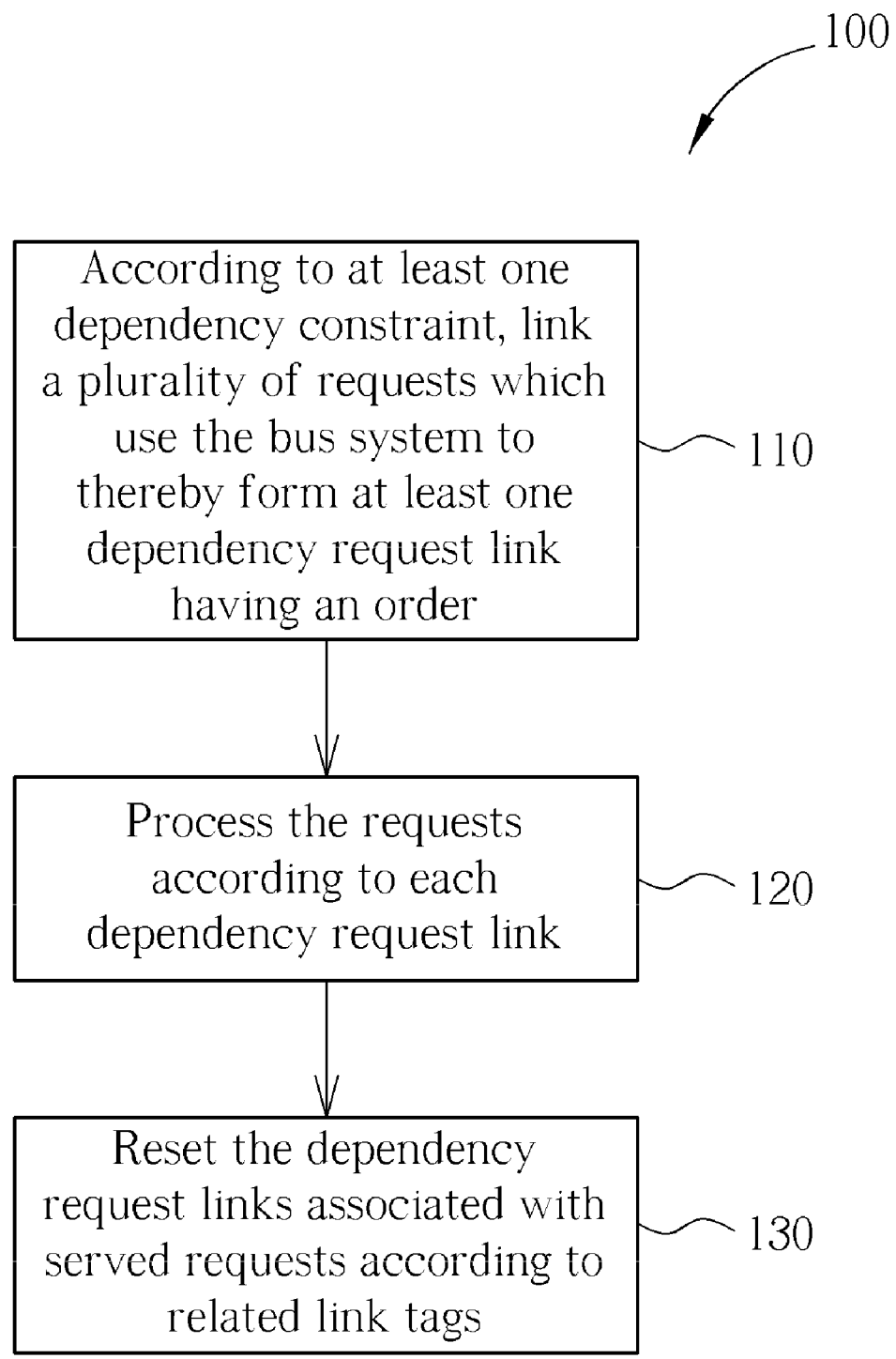
FIG. 1 is a flowchart of an operating method of a bus system according to one embodiment of the invention.

FIG. 1 is a flowchart of an operating method of a bus system according to one embodiment of the invention. The exemplary operating method 100 includes following steps:

Step 110: According to at least one dependency constraint, link a plurality of requests which use the bus system to thereby form at least one dependency request link having an order;

Step 120: Process the requests according to each dependency request link; and

Step 130: Reset the dependency request links associated with served requests according to related link tags.

The operating method 100 of the bus system is detailed using following figures and embodiments.

Figure 2:
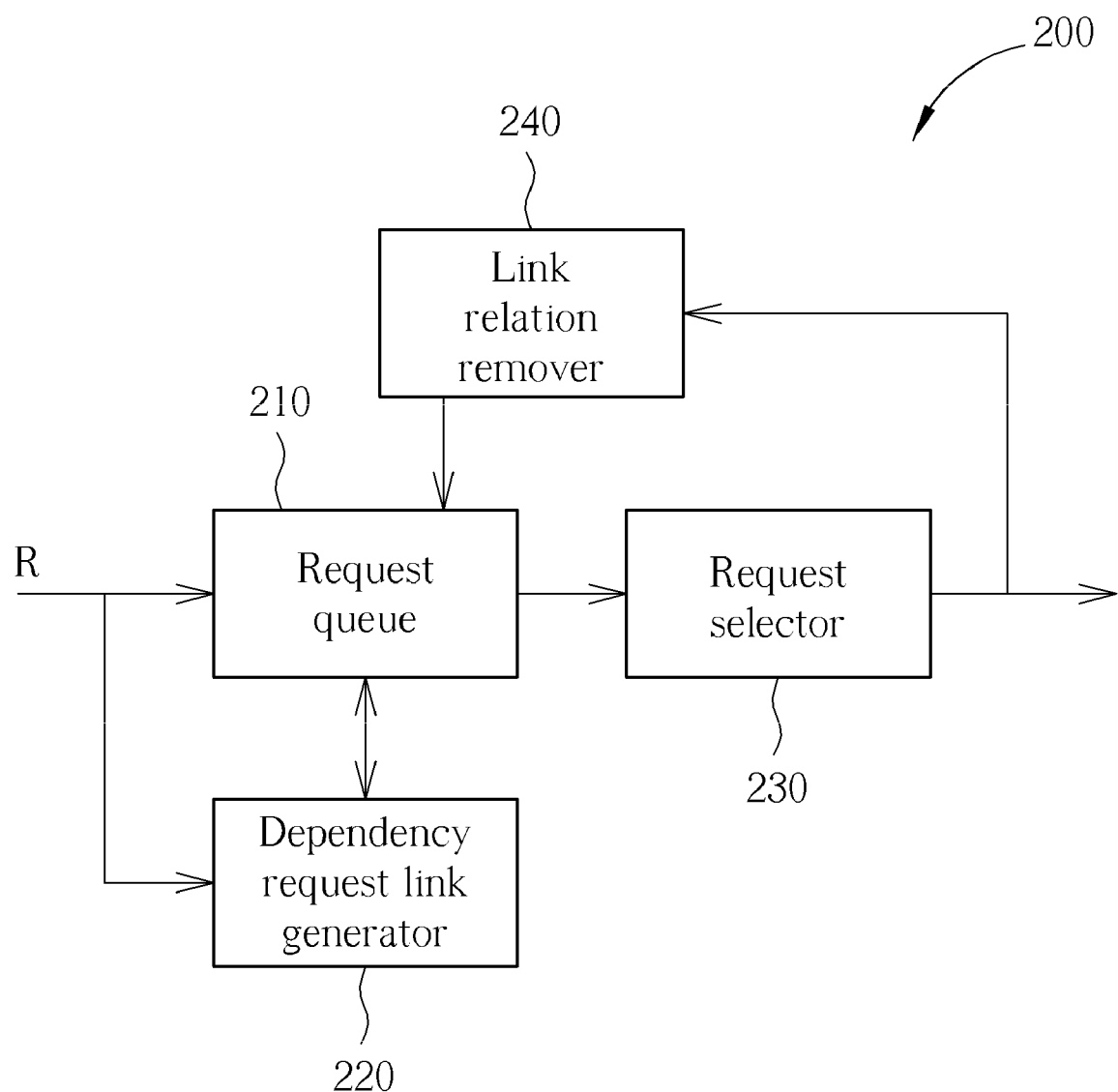
FIG. 2 is a block diagram of a memory scheduler according to one embodiment of the invention.

FIG. 2 is a block diagram of a memory scheduler according to one embodiment of the invention. The memory scheduler 200 includes a request queue 210, a dependency request link generator 220, a request selector 230 and a link relation remover 240, wherein the dependency request link generator 220 is coupled to the request queue 210, the request selector 230 is coupled to the request queue 210 and the link relation remover 240 is coupled to the request queue 210 and the request selector 230. In addition, the memory scheduler 200 is coupled to an out-of-order bus (not shown in FIG. 2), and is configured for referring to at least one dependency constraint to link a plurality of requests which use the out-of-order bus to form at least one dependency request link having an order, and selecting requests qualified to be served according to each dependency request link to thereby allow the plurality of requests to be processed according to the order.

The requests on the bus are transmitted out of order. In order to avoid errors such as data hazards, some requests with dependency should be served in order, and the dependency between requests is determined according to information derived from each request's thread ID, memory page number, etc. For example, according to the bus protocol, requests with the same thread ID (e.g., all 0's) have dependency; in addition, requests that access the same memory page number also have dependency. This rule can prevent data hazards from happening. Therefore, dependency request links can be formed using thread IDs or memory page numbers as dependency constraints. Please notice that the above-mentioned examples are for illustrative purpose only. One skilled in the art can use other dependency constraints to identify the dependency between requests.

Figure 3:
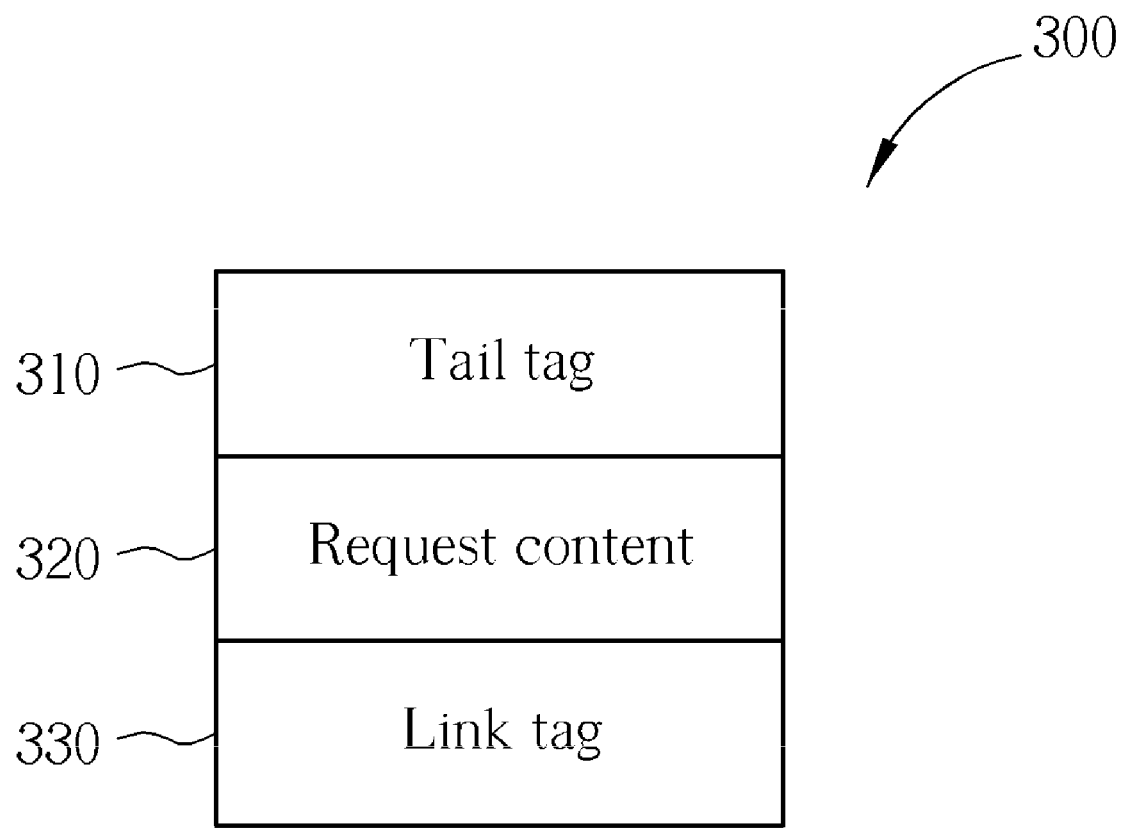
FIG. 3 is a diagram illustrating a structure of a request in a dependency request link formed using a single dependency constraint.

The request queue 210 receives requests R from the bus and buffers the received requests R. FIG. 3 is a diagram illustrating a structure of a request in a dependency request link formed using a single dependency constraint. The request 300 in the request queue 210 has a plurality of fields for recording a tail tag 310, a request content 320 and a link tag 330, respectively. Please notice that the sequence of the fields in the request 300 shown in FIG. 3 is only for illustrative purpose only, and is not meant to be taken as a limitation of the invention. The tail tag 310 is used to indicate if the request is the last request of the dependency request link to which it belongs. The request content 320 is used to save the content to be executed, and the link tag 330 is used to record a link relation indicative of an order associated with the request 300 and plurality of unserved requests stored in the request queue 210. In one embodiment, when the link tag 330 shows that the request 300 has no link relation with other requests, the request 300 is an initial request of at least one dependency request link.

Figure 4:
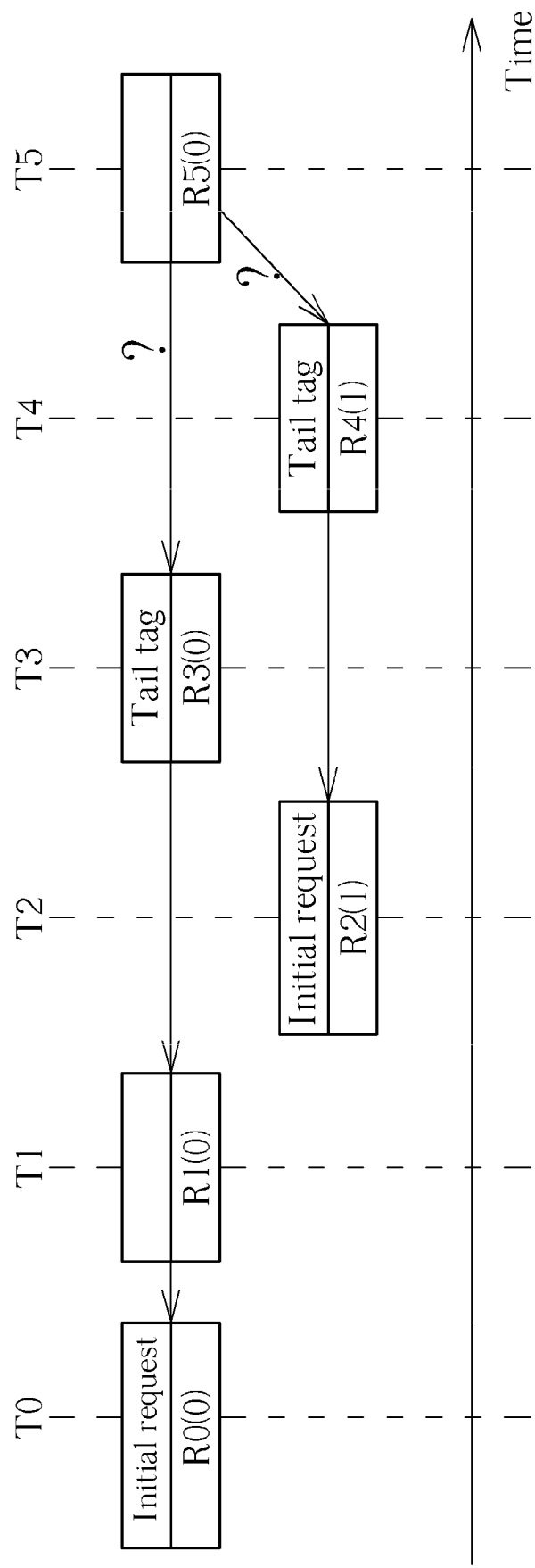
FIG. 4 is a diagram illustrating a link relation of requests that arrived at the memory scheduler at different timings.

FIG. 4 is a diagram illustrating a link relation of requests, each of which arrived at the memory scheduler 200 at different timings. Assume that the request queue 210 at time T5 has stored requests R0(0), R1(0) and R3(0) which have the same thread ID being 0 and are received at time T0, T1 and T3, respectively, and requests R2(1) and R4(1) which have the same thread ID being 1 and are received at time T2 and T4, respectively. The link tag of the request R0(0) shows that the request R0(0) is not linked to any preceding request. In other words, the request R0(0) is the initial request of a dependency link request corresponding to a thread ID being 0 (referred to as a first link hereinafter). The link tag of the request R1(0) shows that the request R1(0) is linked to the preceding request R0(0), the link tag of the request R3(0) shows that the request R3(0) is linked to the preceding request R1(0), and the tail tag of the request R3(0) shows that the request R3(0) is the last request of the first link. On the other hand, the link tag of the request R2(1) shows that the request R2(1) is not linked to any preceding request, which means that the request R2(1) is the initial request of a dependency link request corresponding to a thread ID being 1 (referred to as a second link hereinafter). The link tag of the request R4(1) shows that the request R4(1) is linked to the preceding request R2(1), while the tail tag of the request R4(1) shows that the request R4(1) is also the last request of the second link. At time T5, the memory scheduler 200 receives a new request R5(0) which has a thread ID being 0, and queues it in the request queue 210. According to dependency constraints (e.g., thread ID being 0 or 1), the dependency request link generator 220 finds the last request of the link with the thread ID being 0, which is the request R3(0), makes the newly received request R5(0) linked to the end of the first link, sets the link tag of the request R5(0) to point to the request R3(0) (Step 110), sets the tail tag of the request R5(0) to indicate that the request R5(0) is the last request of the first link, and modifies the tail tag of the request R3(0) to make the request R3(0) not the last one of the first link. Please notice that the dependency request link generator 220 will link the newly received request R5 to the last request of the second link by a method similar to that mentioned above if the request R5's thread ID is 1. And if the request queue 210 doesn't have any request having a thread ID identical to that of the request R5, it means that the newly received request R5 doesn't match any dependency constraint, and the dependency request link generator 220 will set the link tag of the request R5 as an initial request of a newly created request link and set the tail tag of the request R5 to indicate that the request R5 is also the last request of the newly created request link.

As to serving requests, the request selector 230 will choose requests qualified to be served according to unserved requests queued in the request queue 210 and their corresponding dependency request links. The request selector 230 has to choose one request from the initial request of the request links, such as the request R0(0), and then output the request R0(0) qualified to be served. This means that the request R0(0) is allowed to be served (Step 120). The link relation remover 240 will find any request linked to the request R0(0) according to each request's link tag. For example, the request R1(0)'s link tag shows that the request R1(0) is linked to the request R0(0). Next, the link relation remover 240 will remove the request R0(0) and reset the link tag of the request R1(0) to make the request R1(0) take place of the served request R0(0) which is selected by the request selector 230 and then become the initial request of the first link (Step 130). While the request selector 230 has to choose a request to serve again, the request selector 230 will choose the request R1(0) as the request to be served according to R1(0)'s link tag and then output the request R1(0) for execution.

Figure 5:
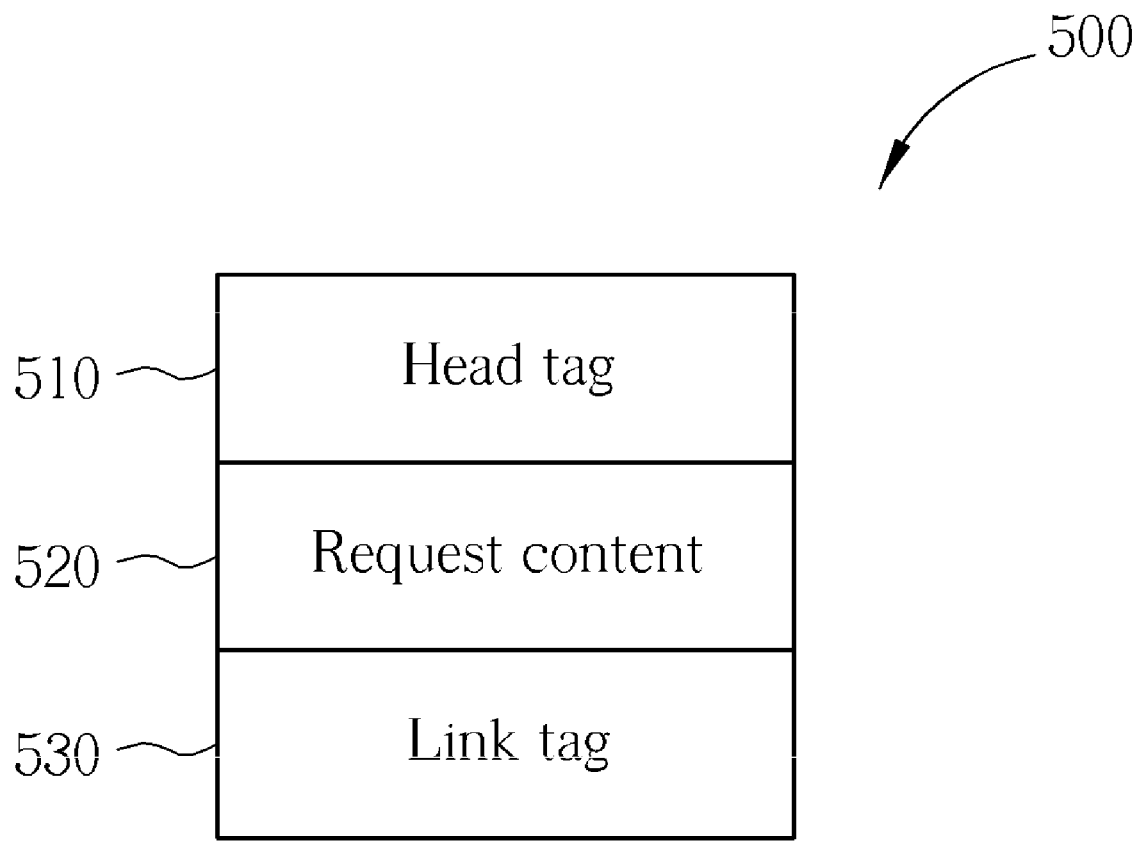
FIG. 5 is a diagram illustrating another structure of a request in a dependency request link formed using a single dependency constraint.

FIG. 5 is a diagram illustrating another one structure of a request in a dependency request link formed using a single dependency constraint. The request 500 stored in the request queue 210 has a plurality of fields recording a head tag 510, a request content 520 and a link tag 530. Please notice that the sequence of the fields in the request 500 shown in FIG. 5 is for illustrative purposes only, and is not meant to be taken as a limitation of the invention. The head tag 510 is to indicate if the request is an initial request of a dependency request link, the request content 520 is to store the content to be executed, and the link tag 530 is to indicate the link relation of the request 500 and other requests in the request queue 210. For example, a bus system has a first request and a second request, and the first request's link tag shows that the first request is linked by the second request. As one skilled in the art can use the structure of the request 500 to form dependency request links and choose requests to serve under the aforementioned teachings directed to using the request 300 to form dependency request links and choose requests, further explanation is omitted here for brevity.

Figure 6:
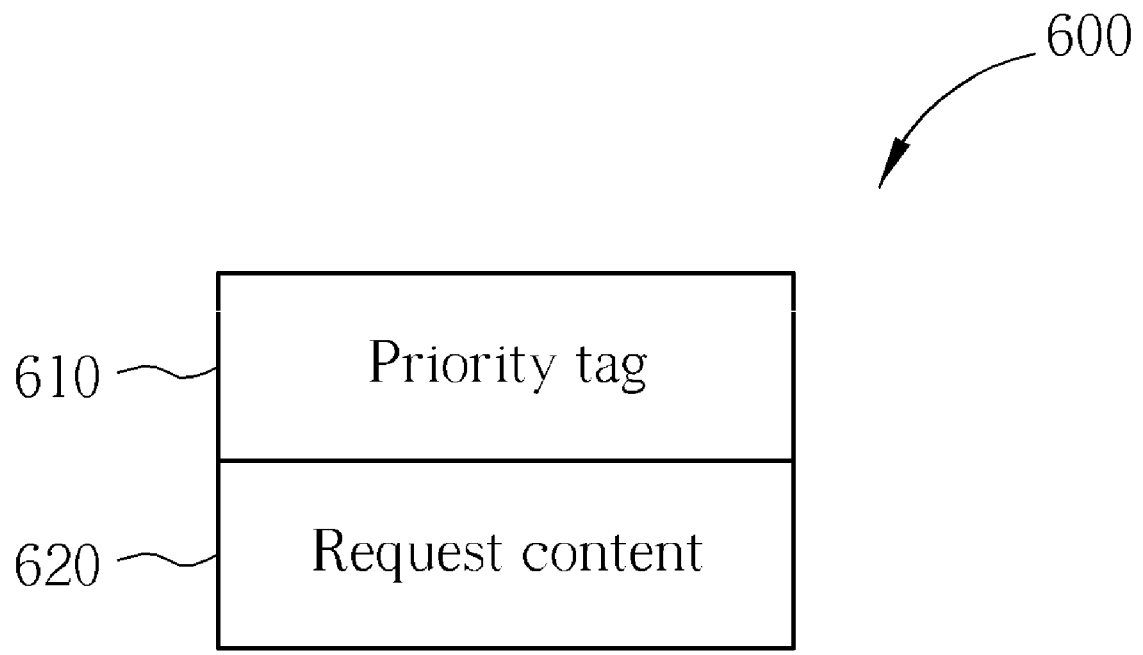
FIG. 6 is a diagram illustrating yet another structure of a request in a dependency request link formed using a single dependency constraint.

FIG. 6 is a diagram illustrating yet another structure of a request in a dependency request link formed using a single dependency constraint. The request 600 in the request queue 210 has a plurality of fields recording a priority tag 610 and a request content 620, respectively. Please notice that the sequence of the fields in the request 600 shown in FIG. 6 is for illustrative purposes only, and is not meant to be taken as a limitation of the invention. The priority tag 610 is to indicate the order of the request 600 in a request link to which the request 600 belongs, and the request content 620 is to store the content to be executed. As one skilled in the art can use the structure of the request 600 to form dependency request links and choose requests to serve under the aforementioned teachings directed to using the request 300 to form dependency request links and choose requests, further explanation is omitted here for brevity.

Figure 7:
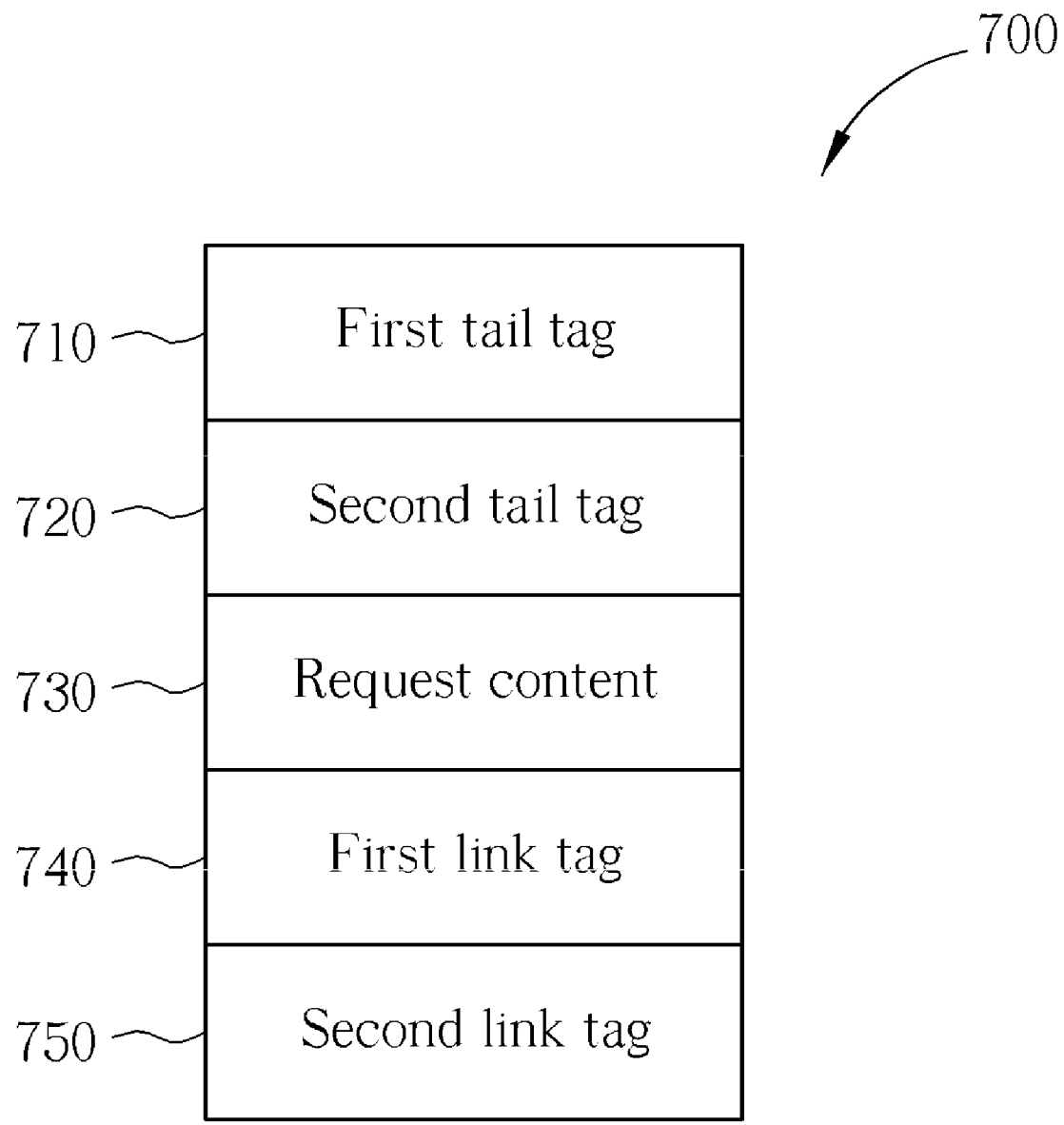
FIG. 7 is a diagram illustrating a structure of a request in a dependency request link formed using two dependency constraints.

In addition to using a single dependency constraint to establish dependency of requests on a bus system, dependency can also be formed by using a plurality of dependency constraints. For example, the thread ID and the memory page number are both referenced to establish the dependency. FIG. 7 is a diagram illustrating a structure of a request in a dependency request link formed using two dependency constraints. The request 700 in the request queue 210 has a plurality of fields recording a first tail tag 710, a second tail tag 720, a request content 730, a first link tag 740, and a second link tag 750, respectively. Please notice that the sequence of the fields in the request 700 shown in FIG. 7 is for illustrative purposes only, and is not meant to be taken as a limitation of the invention. The first tail tag 710 is to indicate if the request 700 is the last request of a first request link formed by the first dependency constraint (e.g. the thread ID), the second tail tag 720 is to indicate if the request 700 is the last request of a second request link formed by the second dependency constraint (e.g., the memory page number), the request content 730 is to store the content to be executed, the first link tag 740 is to indicate the link relation of the request 700 and other requests in the request queue 210 with respect to the first dependency constraint, and the second link tag 750 is to indicate the link relation of the request 700 and other requests in the request queue 210 with respect to the second dependency constraint.

Figure 8:
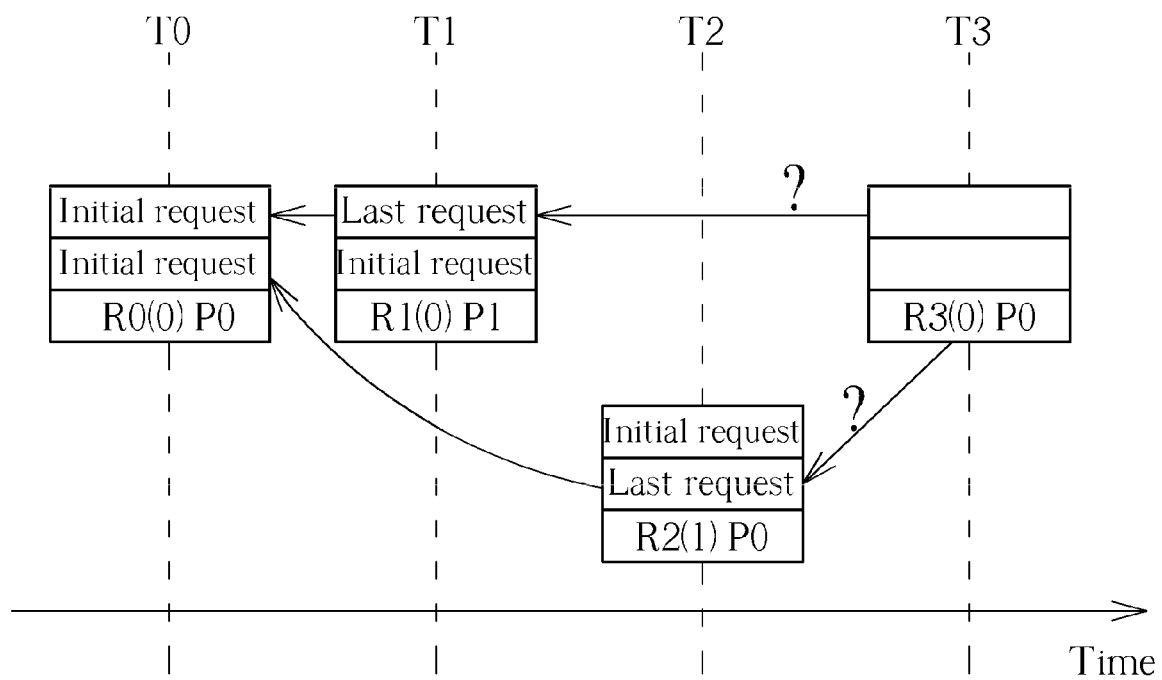
FIG. 8 is a diagram illustrating a link relation of requests that arrived at the memory scheduler at different timings.

FIG. 8 is a diagram illustrating the link relation of requests that have arrived at the memory scheduler 200 at different timings. Assume that the request queue 210 at time T3 has stored request R0(0) P0, R1(0) P1 and R2(1) P0 which are received at time T0, T1 and T2, respectively. The requests R0(0) P0 and R1(0) P1 have the same thread ID being 0, the request R0(0) P0 and R2(1) P0 have the same memory page number being 0, and the request R1(0) P1's memory page number is 1. The request R0(0) P0's first link tag indicates that the request R0(0) P0 is not linked to any preceding requests with the thread ID being 0, so the request R0(0) P0 is the initial request of a dependency request link corresponding to a thread ID being 0 (referred to as a first link hereinafter). The request R0(0) P0's second link tag indicates that the request R0(0) P0 is not linked to any preceding requests with a memory page number being 0, so the request R0(0) P0 is the initial request of a dependency request link corresponding to a memory page number being 0 (referred to as a second link hereinafter).

The request R1(0) P1's first link tag indicates that the request R1(0) P1 is linked to the request R0(0) P0 according to the thread ID which serves as the dependency constraint, and the request R1(0) P1's first tail tag also shows that the request R1(0) P1 is the last request of the first link. Additionally, regarding the memory page number which serves as the dependency constraint, the request R1(0) P1's second link tag indicates that the request R1(0) P1 is not linked to any preceding requests with a memory page number being 1, so the request R1(0) P1 is the initial request of a dependency request link corresponding to a memory page number being 1 (referred to as a third link hereinafter). The second tail link of the request R1(0) P1 indicates that the request R1(0) P1 is also the last request of the third link.

The request R2(1) P0's first link tag indicates that the request R2(1) P0 is not linked to any preceding requests with a thread ID being 1, so the request R2(1) P0 is the initial request of a dependency request link corresponding to a thread ID being 1 (referred to as a fourth link hereinafter). The request R2(1) P0's first tail tag shows that the request R2(1) P0 is also the last request of the fourth link. The request R2(1) P0's second link tag indicates that the request R2(1) P0 is linked to the request R0(0) P0 according to the memory page number which serves as the dependency constraint, and the request R2(1) P0's second tail tag shows that the request R2(1) P0 is also the last request of the second link.

The first, second, third and fourth links are four dependency request links formed by the dependency request link generator 220 according to dependency constraints of a newly received request's link tags. Please notice that the dependency request link generator 220 has to generate N dependency request links according to dependency constraints recorded in N link tags of the newly received request, where N is any positive integer. Moreover, the dependency request link generator 220 also has to show that the newly received request is the last request of the N dependency request links according to N tail tags of the newly received request. In the following, a newly received request is used for detailed illustration.

At time T3, the request R3(0) P0 with a thread ID being 0 and a memory page number being 0 is received by the memory scheduler 200 and queued in the memory queue 210. According to each dependency constraint (e.g., the thread ID being 0 or 1), the dependency request link generator 220 finds the last request of the dependency request link corresponding to a thread ID being 0, i.e., the request R1(0) P1, makes the request R3(0) P0 linked to the end of the first link, sets the request R3(0) P0's first link tag to point to the request R(0) P1, sets the first tail tag of the request R3(0) P0 to indicate that the request R3(0) P0 is the last request of the first link, and modifies the request R1(0) P1's first tail tag to make the request R1(0) P1 not the last request of the first link. Furthermore, according to each dependency constraint (e.g., the memory page number being 0 or 1), the dependency request link generator 220 finds the last request of the dependency request link corresponding to a memory page number being 0, i.e., the request R2(1) P0, makes the request R3(0) P0 linked to the end of the second link, sets the request R3(0) P0's second link tag to point to the request R2(1) P0, sets the second tail tag of the request R3(0) P0 to indicate that the request R3(0) P0 is the last request of the second link, and modifies the request R2(1) P0's second tail tag to make the request R2(1) P0 not the last request of the second link.

Please notice that if the request queue 210 doesn't have any request having a thread ID identical to that of the newly received request, which means the newly received request doesn't match any dependency constraint, the dependency request link generator 220 will set the newly received request's first link tag to indicate that the newly received request is an initial request of a newly created request link with respect to the thread ID which serves as the dependency constraint, and set the newly received request's first tail tag to make the newly received request also the last request of the newly created request link. And if the request queue 210 doesn't have any request having a memory page number identical to that of the newly received request, the dependency request link generator 220 will set the newly received request's second link tag to indicate that the newly received request is an initial request of a newly created request link with respect to the memory page number which serves as the dependency constraint, and set the newly received request's second tail tag to make the newly received request the last request of the newly created request link.

As to serving requests, the request selector 230 will choose requests qualified to be served according to unserved requests queued in the request queue 210 and a plurality of dependency request links. The request selector 230 will determine if the request is the initial request by reading some (e.g. N) link tags included in N dependency request links, and find M initial requests of N dependency request links, wherein one of the M initial requests will be chosen and served. Each of the M initial requests includes at least one link tag showing that the request is an initial request qualified to be served. M and N are positive integers, and M is smaller than N. For example, if link tags of the request R0(0) P0 with respect to every dependency constraint (e.g., the thread ID and the memory page number) indicate that the request R0(0) P0 is the initial request, the request R0(0) P0 is regarded as a request qualified to be served. On the other hand, the request R1(0) P1 is not a request qualified to be served due to the fact that it is the initial request with respect to the memory page number but the thread ID. In another embodiment, if most of the link tags of the request R1(0) P1 with respect to different dependency constraints show that the request R1(0) P1 is the initial request, the request R1(0) P1 could be regarded as a request qualified to be served. In yet another embodiment, if at least one of the link tags of the request R1(0) P1 with respect to different dependency constraints shows that the request R1(0) P1 is the initial request, the request R1(0) P1 could be regarded as a request qualified to be served. Assume that the request selector 230 outputs the request R0(0) P0 qualified to be served, and the link relation remover 240 finds the requests linked to the request R0(0) P0 with respect to each dependency constraint according to each request's link tag. Regarding the thread ID serving as the dependency constraint, the request R1(0) P1 's first link tag indicates that the request R1(0) P1 is linked to the request R0(0) P0, and the link relation remover 240 will reset the request R1(0) P1 's first link tag to make the request R1(0) P1 take the place of the served request R0(0) P0 to serve as the initial request of the first link; regarding the memory page number serving as the dependency constraint, the request R2(0) P0's second link tag shows that the request R2(0) P0 is linked to the request R0(0) P0, and the link relation remover 240 will reset the request R2(0) P0's second link tag to make the request R2(0) P0 take the place of the served request R0(0) P0 to serve as the initial request of the second link.

The request 700 has a structure similar to that of the request 500. That is, the request 700 has a plurality of head tags corresponding to a plurality of dependency constraints and a plurality of link tags corresponding to a plurality of dependency constraints. The link tags are to indicate what other requests are linked to the request. As one skilled in the art can easily understand how to form dependency request links and serve the requests with such a request structure under the teachings directed to exemplary embodiments mentioned above, further explanation is omitted herein for brevity.

Furthermore, the request 700 is allowed to have a structure similar to that of the request 600. That is, the request 700 can be configured to have a plurality of priority tags corresponding to a plurality of dependency constraints. The priority tags are to indicate the order of the request in the dependency request links respectively formed using different dependency constraints. As one skilled in the art can easily understand how to form dependency request links and serve the requests with such a request structure under the teachings directed to aforementioned exemplary embodiments, further explanation is omitted herein for brevity.

Figure 9:
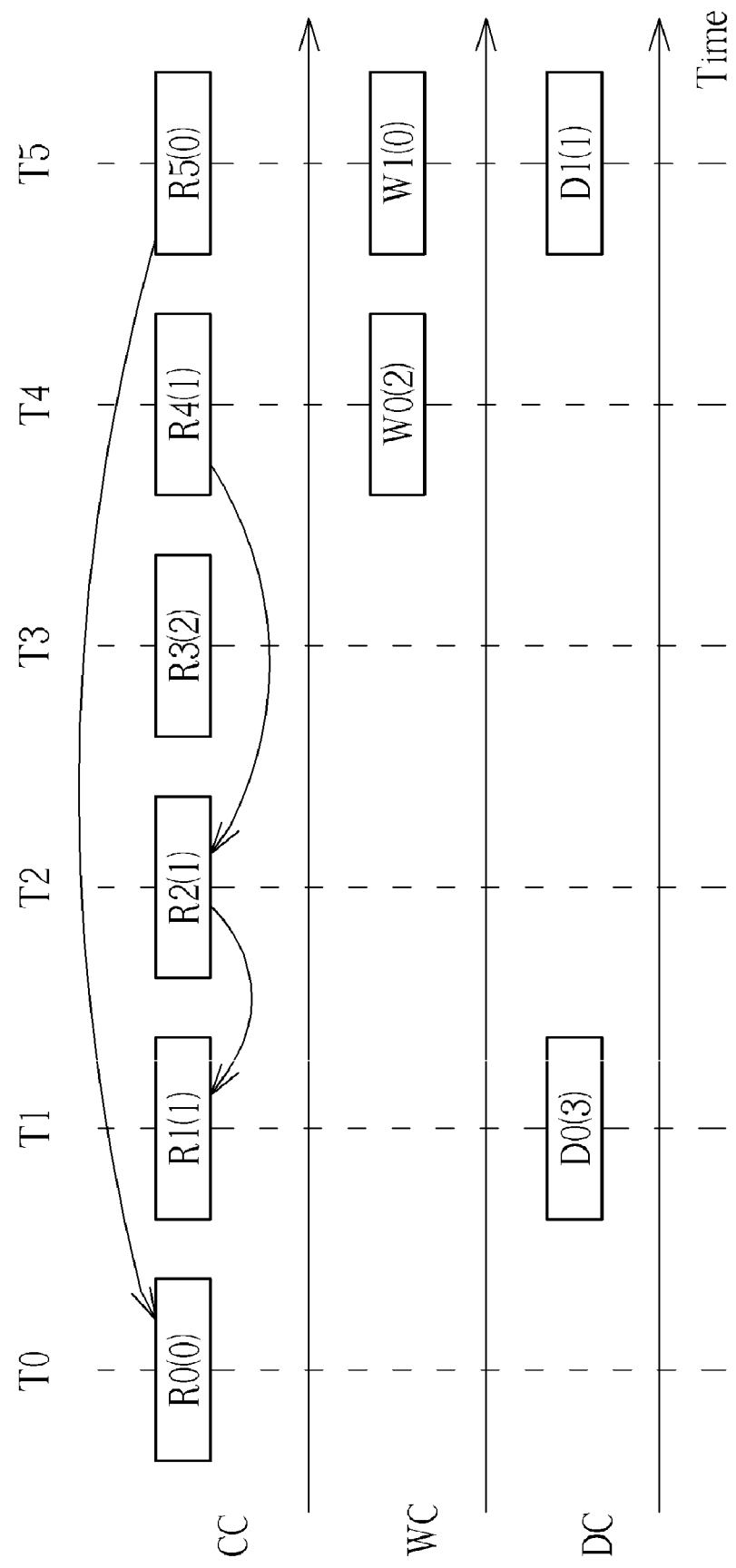
FIG. 9 is a diagram of one embodiment of the invention which performs debug tracing on data transmission on a bus.

Implementing transfer alignment on a multi-thread and out-of-order executive bus is difficult. However, if debug tracing has to be performed upon data transmitted on the bus, transfer alignment is indispensable. One embodiment of the invention is to implement debug tracing on data transmitted on the bus by the technique of establishing dependency between requests. FIG. 9 is a diagram of one exemplary embodiment of the invention which performs debug tracing upon data transmitted on a bus. As shown in FIG. 9, the bus has a command channel CC, a write channel WC, and a response channel DC. On the command channel CC, the requests R0 to R5 are presented from time T0 to T5, respectively. The request R0(0) and R5(0) both have the same thread ID being 0, the requests R(1), R2(1) and R4(1) have the same thread ID being 1, and the request R3(2)'s thread ID is 2. The requests with the same thread ID must be served in order. Therefore, the thread ID is taken as one dependency constraint. At time T2, a debug tracing module (not shown in FIG. 9) finds that the request R2(1) has a thread ID identical to that of the request R1(1), and therefore sets the request R2(1)'s link tag in a request queue (not shown in FIG. 9) to indicate that the request R2(1) is linked to the request R1(1), sets the request R2(1)'s tail tag in the request queue (not shown in FIG. 9) to indicate that the request R2(1) is the last request of the dependency request link corresponding to the thread ID being 1 (referred to as a first link hereinafter), and resets the request R1(1)'s tail tag in the request queue (not shown in FIG. 9) to make the request R1(1) not the last request of the first link. At time T4, the debug tracing module finds that the request R4(1) has a thread ID identical to that of the requests R1(1) and R2(1), and therefore sets the request R4(1) as the last request of the first link according to similar operations mentioned above and modifies the link relation in the first link.

At time T5, a response data D1(1) with a thread ID being 1 is presented on the response channel DC, and the outstanding requests R1(1), R2(1) and R4(1)'s thread IDs are all 1. Based on the above method associated with using tail tags and link tags, it is determined that only one request, R1(1), of these three requests can be served. For this reason, the request R1(1) and the response data D1(1) correspond to the same transaction. By the above method, tracing and recording data transactions of the bus can be achieved. Please notice that as one skilled in the art can implement debug tracing on the bus by using a plurality of dependency constraints, or using related head tags, link tags, and/or priority tags under the teachings directed to exemplary embodiments mentioned above, further description is omitted here for brevity.

Briefly summarized, the exemplary embodiments of the invention provide a method of establishing dependency between requests by using at least one dependency constraint on a multi-thread and out-of-order executive bus system. In this way, the probability of data hazard occurrence can be decreased through referring to the dependency between requests to do related operation on each request.

Those skilled in the art will readily observe that numerous modifications and alterations of the device and method may be made while retaining the teachings of the invention.

What is claimed is:

1. An operation method applied to a bus system, comprising:
    according to at least a dependency constraint, linking a plurality of requests which utilize the bus system to thereby form at least a dependency request link having an order; and
    processing the requests according to each dependency request link and the order thereof;
    wherein processing the requests according to each dependency request link and the order thereof comprises:
    if a first request is an initial request of a dependency request link, serving the first request; and
    resetting the first dependency request link to make a second request take place of the served first request to therefore serve as the initial request of the first dependency request link.

2. The method of claim 1, further comprising:
    according to each dependency constraint, making a newly received request linked to an end of at least a dependency request link, or setting the newly received request to be an initial request and a last request of a first dependency request link when the newly received request does not match any dependency constraint.

3. The method of claim 1, wherein each of the requests includes at least a tag to indicate if the request is a last request of a corresponding request link to which it belongs.

4. The method of claim 1, wherein each of the requests includes at least a tag to indicate the relation between the request and another request.

5. The method of claim 4, wherein a first request is an initial request of at least a dependency request link when the tag indicates that the first request has no link relation with other requests.

6. The method of claim 1, wherein the first request includes at least a first tag which indicates that the first request is linked by the second request following the first request, or the second request includes at least a second tag which indicates that the second request is linked to the first request preceding the second request.

7. The method of claim 1, wherein each of the requests includes at least a tag to indicate the order of the requests in a corresponding dependency request link to which the requests belong.

8. The method of claim 1, further comprising:
finding a tag which indicates that the first request is the initial request of the first dependency request link.

9. The method of claim 1, further comprising:
reading a plurality of tags of a plurality of dependency request links; and
determine if the first request is qualified to be served according to the tags;
wherein the tags are configured to indicate if the first request is an initial request of the dependency request links, and the dependency request links include the first dependency request link.

10. The method of claim 1, wherein the dependency constraint includes at least one of a thread ID, a memory page number, and a data hazard.

11. The method of claim 1, wherein the bus system performs at least one of a memory scheduling and a debug tracing of the requests according to the order.

12. The method of claim 1, being applied to an out-of-order executive bus system.

13. The method of claim 3, wherein linking the requests which utilize the bus system to thereby form the dependency request link having the order comprises:
finding a first request, wherein a first tag included in the first request indicates that the first request is a last request of a first dependency request link;
linking a newly received request corresponding to the first dependency request link to the first request; and
setting a tag of the newly received request to indicate that the newly received request is the last request of the first dependency request link.

14. The method of claim 6, further comprising:
when the first tag or the second tag indicates that the first request is the initial request of the first dependency request link, serving the first request.

15. The method of claim 9, further comprising:
when the tags indicate that the first request is the initial request of the first dependency request link, serving the first request.

16. The method of claim 9, further comprising:
when most of the tags indicate that the first request is the initial request of the first dependency request link, serving the first request.

17. A bus system, comprising:
a request queue, for receiving and storing a newly received request, wherein the newly received request includes at least a link tag;
a dependency request link generator, coupled to the request queue, for generating N dependency request links according to dependency constraints of N link tags of the newly received request, wherein N is any positive integer; and
a request selector, coupled to the request queue, for finding M initial requests of the N dependency request link from the unserved requests, and selecting one from the M initial request for execution, wherein each of the M initial requests includes at least a link tag to indicate that the initial request is capable of being served, M and N are positive integers, and M is smaller than N;
wherein each link tag of the newly received request is to indicates a link relation with respect to an order of the newly received request and a plurality of unserved requests preceding the newly received request.

18. The bus system of claim 17, wherein the dependency request link generator further sets the newly received request as a last request of the N dependency request links according to N tail tags of the newly received request.

19. The bus system of claim 17, further comprising:
a link relation remover, coupled to the request queue and the request selector, for removing a first initial request served by the request selector and setting at least a new initial request according to a dependency constraint corresponding to the first initial request.

20. The bus system of claim 17, being an out-of-order executive bus system.

21. An operation method applied to a bus system, comprising:
according to at least a dependency constraint, linking a plurality of requests which utilize the bus system to thereby format least a dependency request link having an order; and
processing the requests according to each dependency request link and the order thereof;
wherein each of the requests includes at least a tag to indicate if the request is a last request of a corresponding request link to which it belongs, and the step of linking the requests which utilize the bus system to thereby form the dependency request link having the order comprises:
finding a first request, wherein a first tag included in the first request indicates that the first request is a last request of a first dependency request link;
linking a newly received request corresponding to the first dependency request link to the first request; and
setting a tag of the newly received request to indicate that the newly received request is the last request of the first dependency request link.

22. A bus system, comprising:
a request queue, for receiving and storing a newly received request, wherein the newly received request includes at least a link tag; and
a dependency request link generator, coupled to the request queue, for generating N dependency request links according to dependency constraints of N link tags of the newly received request, wherein N is any positive integer;
wherein each link tag of the newly received request is to indicate a link relation with respect to an order of the newly received request and a plurality of unserved requests preceding the newly received request, and the dependency request link generator further sets the newly received request as a last request of the N dependency request links according to N tail tags of the newly received request.

* * * * *